United States Patent [19]

Daley, Jr.

[11] 3,719,807

[45] March 6, 1973

[54] DIGITAL LINEARIZER AND METHOD

[75] Inventor: Francis Darnall Daley, Jr., Baltimore, Md.

[73] Assignee: Electronic Modules Corporation, Cockeysville, Md.

[22] Filed: April 15, 1970

[21] Appl. No.: 28,646

[52] U.S. Cl.......235/92 PL, 235/92 PE, 340/347 AD, 235/92 R

[51] Int. Cl.........................H03k 13/02, H03k 21/36

[58] Field of Search ..............235/92 PE, 92 PL, 154; 340/347 AD

[56] References Cited

UNITED STATES PATENTS 3,414,718 12/1968 McElroy...........................235/92 PL

*Primary Examiner*—Daryl W. Cook
*Assistant Examiner*—Joseph M. Thesz
*Attorney*—Reginald F. Pippin, Jr.

[57] ABSTRACT

A digital linearizer is provided, having a binary coded digital counter and a primary bit generating means for generating a bit count which is a direct function of a a non-linearly measured variable desired to be linearly digitally indicated by the counter. The primary bit input into the counter is controlled by a gate arrangement which enables the addition of a next succeeding accumulative bit from the primary bit source, the addition of a supplementary bit to the counter between primary bit additions, or the inhibiting or defeating of the entry of a bit from the primary bit source to the counter. This gate arrangement is in turn controlled as a function of the examination of each individual sequential numerical count in the counter, and at selected predetermined individual numerical count values in the counter a supplementary compensating bit is added through the gate to the counter, or is effectively subtracted by inhibiting a next succeeding primary bit, based upon a predetermined calculation of theretofore non-compensated non-linearity error required to be compensated at the individual count value in the counter.

25 Claims, 4 Drawing Figures

INVENTOR
FRANCIS D. DALEY, JR.

INVENTOR

FRANCIS D. DALEY, JR.

DIGITAL LINEARIZER AND METHOD

This invention relates to a digital linearizer and method for digital linearization, within close limits, of a variable whose measurement is effected non-linearly, and the measurement of which is desired to be digitally indicated in a linearized form.

Thermocouples and other sensors normally encountered in data acquisition systems exhibit non-linear output characteristics with respect to the variable being measured, such as voltage output versus temperature input. Such sensors are conventionally analog and non-linear in nature, and it is frequently desirable to digitally indicate the instant value of a given sensor, on a periodic or other basis, in desirably closely linearized form. The linearized digital indication may be required for visual readout, and/or for further input into a computational or other use system, such as in process control networks employing digital computer control systems.

One conventional technique for accomplishing this linearization has been to introduce a compensating non-linear analog element into the signal path of the non-linearly measured analog variable, which compensating non-linear element has characteristics that are the inverse, or approximately the inverse, of the transducer or other sensor non-linearity output characteristics. Mechanization of this technique has variously taken the form of amplifiers with diode breakpoint feed-back loops, or amplifiers followed by non-linear diode breakpoint attenuators. These circuits are often costly and require both careful initial set up and periodic calibration.

Also, in instances where general purpose computer capability has been available with large excess storage availability, this linearization has been effected through the medium of table look-up technique subroutines. While such will enable almost any desired degree of linearization, it will be apparent that such a system has a substantial disadvantage in requiring the costly utilization of computer memory storage and computer use time, thereby increasing the computation system overhead.

It has been proposed to provide a digital accumulating readout counter, with a secondary frequency divider control counter in which the frequency divider control counter is periodically restarted in the course of providing the count to the accumulating counter, and in which the frequency divider has several frequency dividing output counts which are employed in conjunction with the output from succeeding ranges of counts from the accumulating counter to effect adding of pulses or inhibiting of pulses to the accumulating counter. This variable frequency divider technique has a number of disadvantages, including the requirement of a secondary frequency dividing counter, and the difficulty of avoiding large step errors at the intermediate accumulated count values between frequency division determined compensating add and subtract points.

It is a feature of the present invention to provide a digital linearizer for non-linearly measured variables which are desired to be digitally indicated, and which enables the employment of a single accumulator counter, the individual numerical count of the single accumulator counter serving as the control on a discrete individual numerical accumulated count basis to enable the addition of a compensating bit, or the subtraction by primary bit inhibition or defeat, at each individual discrete count accumulator value at which it has been predetermined that the previously uncompensated accumulated digital count value would be in error by an amount greater than ½ of a numerical bit count of the accumulator.

It is a further feature to provide a method of digitally linearizing a non-linearly appearing variable, including sequentially registering each individual count bit in the total instant appearing bit count value of said digital non-linearly appearing variable, adding individual supplementary count bits to the registered discrete bit count and inhibiting registry of individual succeeding count bits representing said digital non-linear variable at each individual discrete bit count value where the accumulated non-compensated error exceeds ½ bit count in a minus or a plus direction respectively.

Still other objects, features and attendant advantages will become apparent to those skilled in the art from a reading of the following detailed description of a preferred embodiment taken in conjunction with the accompanying drawings wherein.

Figure 1:
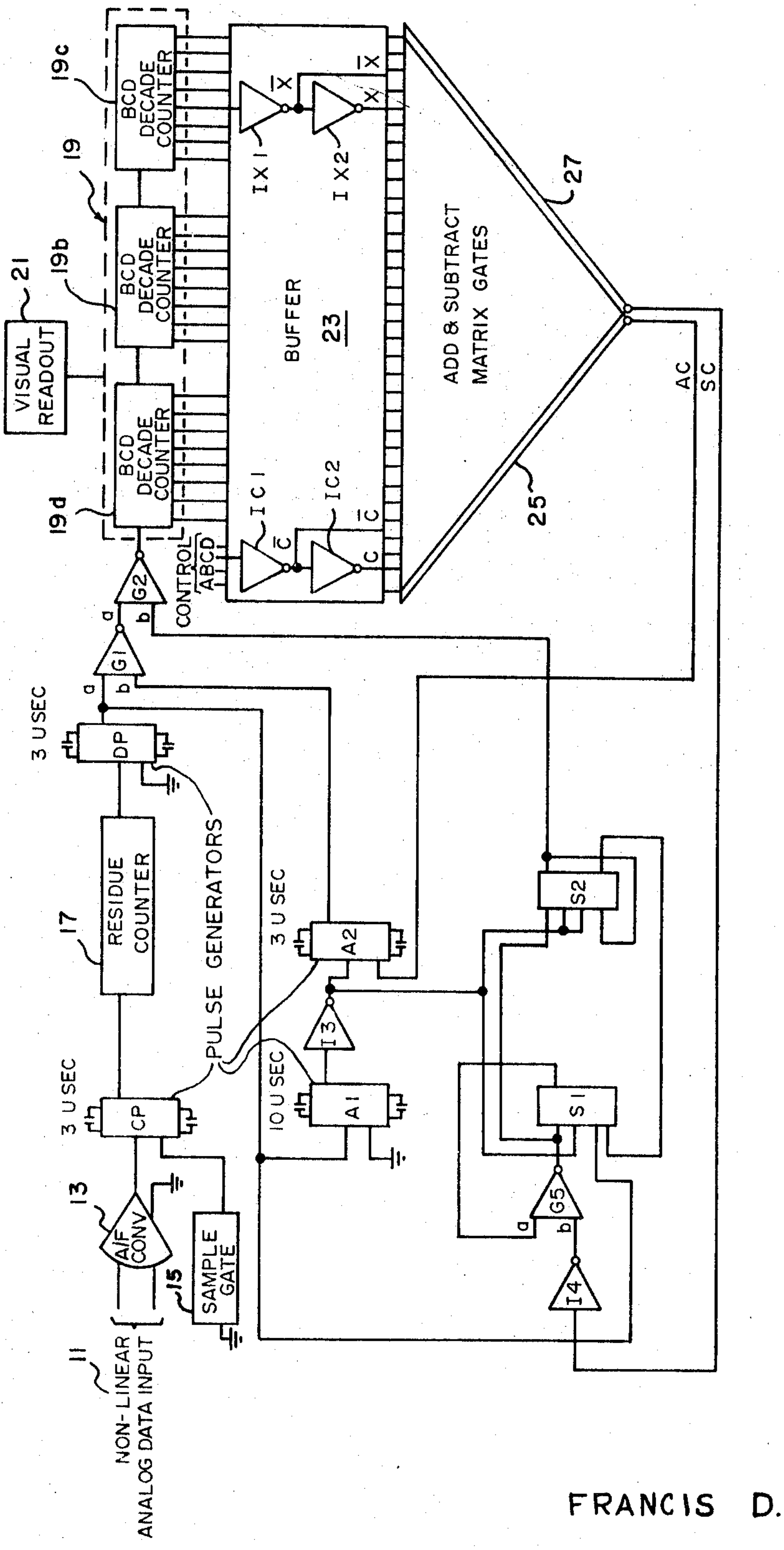
FIG. 1 is a schematic circuit diagram of a digital linearizer according to the invention.

Referring now in detail to the figures of the drawing, a non-linearly appearing analog data input generally indicated at 11 is applied to an analog-to-frequency (A/F) converter 13 which may be of any conventional or desired construction, and which has the characteristic of generating a variable frequency signal as a direct function of the analog input thereto. For instance, the non-linearly appearing analog data input 11 may represent a voltage which is the output from a transducer measuring a given variable, such as temperature, the transducer in this particular instance being for example a thermocouple. In such instance, the A/F converter will generate a signal frequency which is a function of the voltage thereto. Various other types of variable inputs might be employed, utilizing a suitable A/F converter for accepting such different input signals.

The output of A/F converter 13 is applied to a pulse generator CP, which has the characteristic of generating a suitable usable pulse, such as a generally square-wave pulse, converter. The pulse generator CP may suitably take the form of a one shot multi-vibrator, having an enable input. A sample gate 15 may be suitably connected the enable input of the pulse generator CP, which sample gate 15 may be periodically actuated as by a timer, not shown, in order to enable the generation of a train of pulses by the pulse generator DP during a given preselected pulse train time interval $t_k$. As mentioned above, this incremental sample enabling of the pulse generator CP may be repeated from time to time as may be desired to obtain a new digital reading of the analog data input. The total quantum pulse count value of the pulse train from the pulse generator CP during the fixed time interval $t_k$ will accordingly be a direct representation of the instant value of the analog data input 11 to the A/F converter.

While the pulse train from pulse generator CP may, if desired, be utilized without frequency division for the purpose of actuating the counter hereinafter described, such pulse train is normally of a comparatively higher frequency than necessary for desired resolution which renders it desirable to pass the pulse train into a residue counter 17, the output pulse frequency of which is at a lower frequency directly proportional to the frequency. In addition, the residue counter 17 may in accordance with conventional construction of such residue counters have the characteristic of generating one additional pulse when the total input pulse count from CP thereto has a dividend remainder count equal to or in excess of half of the quantum pulse count from pulse generator CP required for the generation of a signal pulse by residue counter 17, thereby providing round-off.

The overflow output from residue counter 17 triggers pulse generator DP, which is normally enabled by connection of its enable input to ground or other suitable enable input for a given pulse generator. Accordingly, the pulse train output of pulse generator DP, which may similarly be a one shot multi-vibrator, directly follows the overflow output from residue counter 17, and thereby directly reflects in total quantum value the digitized value of the analog data input 11, in uncompensated form.

The pulse train output of pulse generator DP is fed not only to an accumulator counter 19, but also to an add pulse circuit A1, I3, A2 and a subtract pulse circuit I4, G5, S1, S2. The normally quiescent add pulse output of add pulse circuit A1, I3, A2 is connected to one input of a control gate G1 into accumulator counter 19, and the normally quiescent inhibit output of subtract pulse circuit I4, G5, S1, S2 is connected to one input into a further control gate G2 into accumulator counter 19.

Gates G1 and G2, as well as all other logic devices in the illustrative embodiment, are positive logic devices, operating on positive going signals. It will be apparent that other types of logic devices may be employed if desired, including negative logic devices and various combinations of positive and negative logic devices. In the present embodiment all gates G1–G5 are NOR gates, although other equivalent logic devices may be employed in carrying out the invention in other embodiments, as desired.

The train of pulses from DP are fed through gates G1 and G2 to accumulator 19, which may suitably take the form of a binary coded decimal (BCD) accumulator register counter, having one or more BCD decade counter sections 19*a*, 19*b*, 19*c*, etc., as may be necessary for accommodating the desired maximum count to be registered. Any suitable visual or other desired readout 21 may be provided for counter 19 as may be desired.

BCD counter 19 has its binary coded register outputs connected through a buffer 23 to two sets of matrix gates 25 and 27. Matrix gates 25 provide an add command output AC, and matrix gates 27 provide a subtract command output SC.

Buffer 23 may conventionally include multiple sets of logic signal buffer inverters IX1, IX2 for the various binary output positions of BCD counter 19, and as may be required for the various matrix gates 25 and 27, and as is schematically illustrated in FIG. 1. A one condition output of any of the counter register outputs will be represented by a zero output $\overline{X}$ at IX1 and a one output X at IX2. Similarly, a zero condition output of any of the counter register outputs will be represented by a one output at IX1 and a zero output at IX2.

The add and subtract matrix gates 25 and 27 may be of conventional construction and a construction may be chosen so as to operate on either a 1 or zero input basis. In one preferred embodiment such gates 25 and 27 have been of a conventional logical NOR type which operates on presence of zero inputs.

Figure 3:
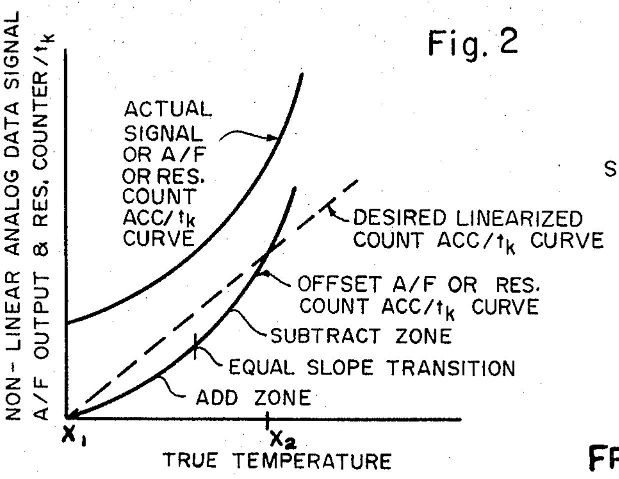
FIG. 3 is a generalized diagram of a typical measurement curve compensation desired to be effected.
Figure 4:
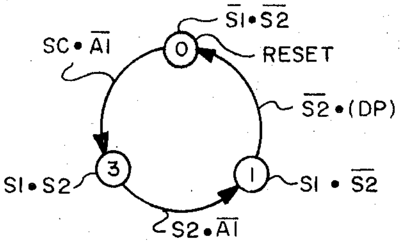
FIG. 4 is a sequential state diagram for the bi-stable subtract switches of the embodiment of FIG. 1.

A plurality of matrix gates 25 and gates 27 are provided, dependent upon the number of decimal value numerical count states of counter 19 where a linearizing count correction is predetermined to be required based on preanalysis of the non-linear response curve of a given transducer or other non-linear output device which may form the non-linearly appearing analog input 11 to the digital linearizer. This analysis is made on the basis of adding or subtracting a bit count in accumulator 19 whenever the theretofore non-corrected accumulator bit count is in error by a selected portion of a bit count, preferably when the error is equal to or exceeds one-half bit count. Thus, a given analog input curve primary bit count in accumulator 19 from pulse generator DP might be determined to require add corrections after primary bit accumulator counts 13, 30, 55 and 101, and to require bit subtractions after primary bit accumulator counts 214, 250, 265 and 273, when operating over a transducer range of $X_1$ to $X_2$, as generally illustrated diagrammatically in FIG. 3. The accumulatively corrected accumulator states which would require incremental add and subtract gates 25 and 27 respectively would accordingly be 13, 31, 57 and 104 for add gate commands AC, and 218, 253, 267 and 274 for subtract commands SC. The effect of each incremental bit supplemental addition or subtraction is to shift in one bit increments the accumulation curve of primary bits in accumulator 19 up or down with respect to the desired linear curve to bring the accumulator curve value within one bit error at each accumulator count value. In those commonly occurring instances where bit axis offset of the bit accumulation curve is required or desirable, as when the bit count at $X_1$ (FIG. 3) is greater than zero and it is desired to have zero accumulated count in counter 19 at $X_1$ reading, such may be readily effected in several ways, including presetting an offset negative count in the accumulator counter 19, such that at $X_1$ the counter 19 will register zero, or such other $X_1$ count value as may be desired.

In order to provide greater versatility and operational capacity control inputs generally indicated at A, B, C, and D are provided to form additional logical inputs into the various add gates 25 and subtract gates 27. Such control inputs may be provided from a simple manual switch arrangement, or may be derived automatically as from a stored program, or otherwise as may be desired. This enables the selective handling by the gate matrices 25 and 27 of various different predetermined linearization sequence requirements, as for different types and ranges of transducers desired to be linearized. Of course, a corresponding gate must be provided in matrix 25 or 27 for each numerical count position in accumulator 19 which may require correction for the various linearization sequences to be accommodated. For instance a further accumulatively corrected linearization accumulator count correction sequence requirement for another transducer might be add after 31, 90 and 150 and subtract after 267, 500 and 704. Control input $\bar{A}\ \bar{B}\ \bar{C}$ D could be employed as a control input to gates for accumulator 19 count states 13, 31, 57, 104, 218, 253, 267 and 274, while control input $\bar{A}\ \bar{B}\ \bar{C}\ \bar{D}$ could be employed as a control input to gates 25, 27 for count states 31, 90, 150, 267, 500 and 704. In this illustration it will be seen that the gates for one of the add states (31) and one of the subtract states (267) are common to both linearization sequence requirements, in which instance the gates 25 and 27 for each numerical state 31 and 267 will be actuated to provide respective add and subtract commands, AC and SC respectively, in presence of either $\bar{A}\ \bar{B}\ \bar{C}$ D or $\bar{A}\ \bar{B}\ \bar{C}\ \bar{D}$ or alternatively duplicate matrix gates may be used as required for each transducer linearization sequence, with suitable control line combinations for each matrix gate in each sequence. Obviously, other sequences may be equally well accommodated as required, with or without identity of overlap in count correction gate values, the four control gates A B C and D providing 16 possible individually selectively controlled sequence combinations for gate matrices 25, 27.

The common add command AC output of matrix gate 25 is connected to the enable input of pulse generator A2, which may suitably be a one shot multivibrator having a suitable short duration pulse, e.g., 3 micro-seconds. Pulse generator A2 is normally disabled and is enabled in the presence of an add command AC.

The actuating signal input to pulse generator A2 is from pulse generator A1 and gate inverter I3. Pulse generator A1, which may also be a one shot multivibrator, has a pulse output of longer duration than the combined time period of the output pulse from pulse generator DP together with the transient time for formation of an add command AC and enabling set-up of pulse generator A2. Thus, in the illustrative embodiment the duration of pulses from DP is 3 micro-seconds and from A1, is 10 microseconds, with a maximum required primary pulse repetition rate from DP of the order to approximately one DP pulse/20–25 micro-seconds or approximately 40–50 $KH_z$ maximum required primary pulse rate from DP. This spacing enables good settling of normally used components and aids in preventing loss of desired add and subtract operations.

The output of pulse generator A1 in the illustrative embodiment is normally at −6 volts which is the zero state. Upon receiving a DP pulse, A1 generates a positive going pulse which rises to 0 volts, this representing the one state. Inverter I3 inverts the A1 pulse signal, and at the end of the 10 second period the positive going trailing edge of the inverted pulse output, which goes to a 0 volts or one state, actuates the pulse generator A2 only if such pulse generator A2 is enable conditioned by the presence of an add command AC. In such event the output of A2 goes to the one state and causes the output of NOR gate G1 to go to zero state, thereby causing the output of G2 to go to one state and thereby effect addition of a supplementary bit count into accumulator counter 19 before the occurrence of the next primary bit count from pulse generator DP.

Figure 2:
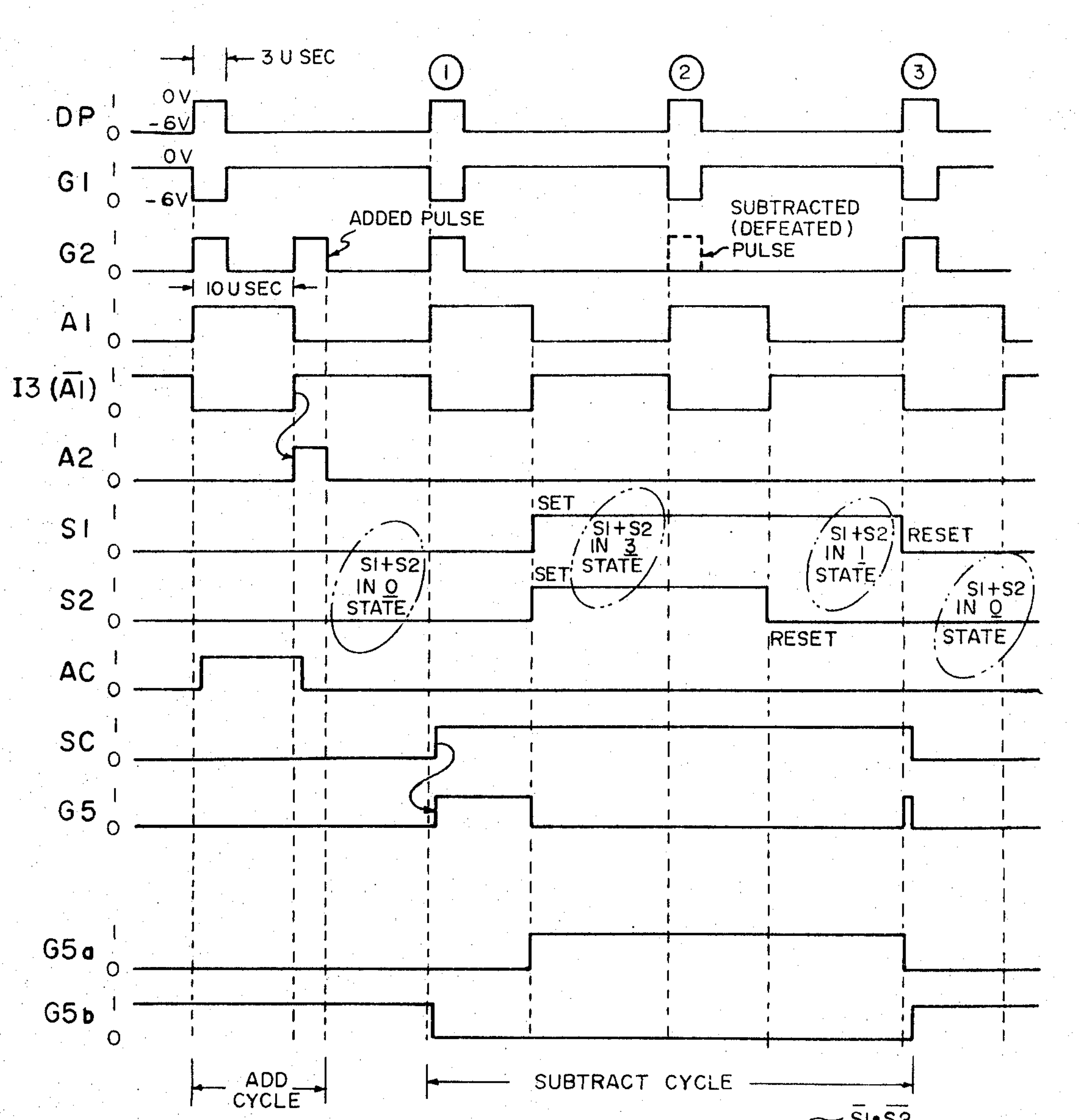
FIG. 2 is a time sequence diagram of input and output values for various components of the digital linearizer of FIG. 1.

The subtract command SC output is connected to the input of an inverter I4, the normally one state output of which forms one input into NOR gate G5, the normally zero state output of which is applied to the set enable inputs of flip-flops S1 and S2, which may suitably be bi-stable multivibrators. The normal quiescent Q output of each of S1 and S2 is in the zero state, and accordingly, the input *b* to Gate 5 is normally in zero state, enabling the passage of DP pulses into counter 19. However, when the subtract command SC causes the set enablement of S1 and S2, the subsequent occurrence of the positive going pulse from I3, at the trailing edge of the pulse from A1, sets both S1 and S2, thereby causing the Q outputs of S1 and S2 to go to one state. This one state signal applied to the *b* input of gate G2 prevents this gate G2 from going to a one state output and adding a primary count on the occurrence of the next succeeding primary pulse by DP, as the G5*b* input will remain at one state for a period past the termination of this next succeeding primary DP pulse, which pulse is indicated by a circled 2 in FIG. 2.

The Q output of S2 remains in the one state (the combined state of S1 and S2 being designated as the 3 state at this time of Q output as one for both S1 and S2) until the trailing edge of the next succeeding $\overline{A1}$ pulse (the positive going edge of the I3 pulse) occurs, at which time S2 is reset, as its reset enable had been set to one state by the feed-back connection from the one state Q output of S2. The Q output is thereby reset to zero state, thereby enabling the next succeeding (i.e., third) DP pulse to effect a primary bit count change in the counter 19.

However, S1 does not reset when S2 is reset, as the 10 micro-second delay pulse from I3 after this second DP pulse (2) is not applied to the reset input of S1, and further the reset enable input of S1 is at this time in the disabled condition by feed-back application of a zero signal from the $\bar{Q}$ output of S2. This S1 S2 combined state is indicated as state one for S1, S2.

Upon the reset of S2, its $\bar{Q}$ output goes to one, thereby applying an enabling signal to the reset enable input to S1. The next succeeding or third primary data pulse DP will thereby reset S1, with its Q output returning to zero state. As the subtract command SC remains on for a short transition period after occurrence of the pulse DP, both inputs *a* and *b* to gate G5 will momentarily be zero and gate G5 will go to one output state, thereby enabling set of S1 and S2. However, this condition only lasts until the subtract command is removed, and as no other count pulses or I3 pulses occur during this period, this brief enable condition is of no consequence. Such subtract command removal occurs in the event that the count in counter 19 that results from this third primary data pulse (3) (i.e., the first primary data pulse after the inhibiting or subtracting of a pulse) is one for which a subtraction is not required. If such a subtraction is required, then the G5 output will remain in the one state and the subtract or pulse bit inhibit operation cycle will be repeated, at the conclusion of which a next succeeding pulse DP will cause entry of a pulse bit into the counter 19, stepping the counter to the next count value, at which point the gates 25, 27 will or will not be actuated, again dependent upon the respective preset input matrix of each gate and the instant then accumulated bit count in counter 19.

Within generally practical limits of non-linearity rates of change of various non-linear devices, such as most normally used thermocouples, the one bit correction per primary bit added is quite practical and offers linearized accuracy of ± one-half bit count. However, if desired to accommodate a greater rate of error change, more counts may be selectively added between primary bit counts, as by providing a second, third, fourth, etc. set of add circuit devices A1, I3 and A2, actuated in selected combinations through logical AND gates having multiple different add command AC inputs thereto. Each such additional pulse generator A1 would then have a different pulse duration greater than the preceding A1 and A2 total pulse time, and the period between primary pulses would be lengthened to accommodate the desired total quantity of supplementary added pulse bits between primary pulses.

While the invention has been illustrated and described with respect to a preferred embodiment and modifications thereof, it will be apparent to those skilled in the art that various other modifications and improvements may be made without departing from the scope and spirit of the invention. For instance, in lieu of the A/F converter and sample gate pulse generator arrangement for providing a pulse train proportional in quantity to the analog data input, one may employ other means for providing this total quantum pulse train for actuating the accumulator, with or without the residue counter arrangement. For example, a dual ramp integration A/D converter may be employed to generate a resultant total quantum pulse train which is a function of the analog data input value. Accordingly, the invention is not to be limited by the particular illustrative embodiment, but only by the scope of the appended claims.

That which is claimed is:

1. A digital linearizer for non-linearly appearing variables desired to be digitally indicated or recorded in linearized form, comprising a digital counter a base pulse generator for generating a quantum pulse count in the form of a train of pulses varying in total quantity as a predetermined function of a non-linear variable to be indicated or recorded, connecting means connecting the output of said base pulse generating means to said counter, supplementary count adding means having an output in individual count adding connection to said digital counter, selective individual-discrete-count-responsive add gate means connected in responsive relation to the count output of said counter and being connected in count output responsive controlling relation to said supplementary count adding means, count defeat means operative to defeat the change of count state of said counter by a pulse from said base pulse generating means, and selective individual-discrete-count-responsive subtract gate means connected in responsive relation to the count output of said counter and being connected in count output responsive controlling relation to said count defeat means.

2. A digital linearizer according to claim 1, further comprising gate-control means for selectively modifying said individual-discrete-count-responsive add gate means and subtract gate means to enable linearizing accommodation of different non-linear variables desired to be linearized.

3. A digital linearizer according to claim 2, said count adding means comprising a gate in controlling relation to said counter, and an add pulse generator having its output connected in controlling relation to said counter, said add pulse generator being disabled except in the presence of an add command from said add gate means.

4. A digital linearizer according to claim 3, said count adding means further comprising time delay pulse generating means responsive to the output from said base pulse generator and having its output effectively connected in controlling relation to said add pulse generator to effect generation of an add pulse by said add pulse generator in the presence of an add command from said add gate means and after completion of the registry of a first base pulse count by said counter and before the registry of a succeeding base pulse count by said counter.

5. A digital linearizer according to claim 4, further comprising second time delay pulse generating means and a second add pulse generator, said second add pulse generator having its output connected in controlling relation to said counter, said second add pulse generator being disabled except in the presence of an add command from said add gate means, said second time delay pulse generating means being responsive to the output from said base pulse generator and having its output effectively connected in controlling relation to said add pulse generator to effect generation of an add pulse by said add pulse generator in the presence of an add command from said add gate means and after completion of the registry of a first base pulse count by said counter and before the registry of a succeeding base pulse count by said counter, said second time delay pulse generating means having a longer time delay period than the first said time delay pulse generating means to enable the generation of a second add pulse after said add pulse from said first add pulse generator, and further selective individual-discrete-count-responsive add gate means connected in add command controlling enabling relation to said second add pulse generator.

6. A digital linearizer according to claim 1, said count adding means comprising a gate in controlling relation to said counter, and an add pulse generator having its output connected in controlling relation to said counter, said add pulse generator being disabled except in the presence of an add command from said add gate means.

7. A digital linearizer according to claim 6, said count adding means further comprising time delay pulse generating means responsive to the output from said base pulse generator and having its output effectively connected in controlling relation to said add pulse generator to effect generation of an add pulse by said add pulse generator in the presence of an add command from said add gate means and after completion of the registry of a first base pulse count by said counter and before the registry of a succeeding base pulse count by said counter.

8. A digital linearizer according to claim 7, second time delay pulse generating means and a second add pulse generator, said second add pulse generator having its output connected in controlling relation to said counter, said second add pulse generator being disabled except in the presence of an add command from said add gate means, said second time delay pulse generating means being responsive to the output from said base pulse generator and having its output effectively connected in controlling relation to said add pulse generator to effect generation of an add pulse by said add pulse generator in the presence of an add command from said add gate means and after completion of the registry of a first base pulse count by said counter and before the registry of a succeeding base pulse count by said counter, said second time delay pulse generating means having a longer time delay period than the first said time delay pulse generating means to enable the generation of a second add pulse after said add pulse from said first add pulse generator, and further selective individual-discrete-count-responsive add gate means connected in add command controlling enabling relation to said second add pulse generator.

9. A digital linearizer according to claim 1, said count defeat means comprising a first bi-stable switch having an output in controlling relation with the input to said counter from said count adding means, and being responsive to a time sequence combination of a signal from said subtract gate means and the occurrence of a base pulse by said base pulse generating means.

10. A digital linearizer according to claim 9, further comprising further pulse generating means operative to generate a pulse of longer duration than the duration of each of said base pulses, but of shorter time duration than the time period between succeeding said base pulses, said bi-stable switch being responsive to the output of said further pulse generating means to switch between its bi-stable conditions.

11. A digital linearizer according to claim 10, further comprising enabling means enabling switching of said bi-stable switch in response to successive pulses from said further pulse generator only when a subtract command is in existence as a function of said subtract gate means.

12. A digital linearizer according to claim 11, said enabling means comprising further gate means between said subtract gate means and said bi-stable switch, and having one of its inputs responsive to the output from said subtract gate means, and a further bi-stable switch in feed-back relation with another input to said further gate means, and having a control input thereto connected to the output of said further gate means.

13. A digital linearizer according to claim 12, further comprising gate-control means for selectively modifying said individual-discrete-count-responsive gate means to enable linearizing accommodation of different non-linear variables desired to be linearized.

14. A digital linearizer according to claim 9, further comprising gate-control means for selectively modifying said individual-discrete-count-responsive add gate means and subtract gate means to enable linearizing accommodation of different non-linear variables desired to be linearized.

15. A digital linearizer according to claim 1, said counter being a binary coded decimal accumulator, and having visual readout means associated therewith.

16. A digital linearizer according to claim 1, said individual-discrete-count-responsive gate means comprising a plurality of discrete count gates each having an input from said counter corresponding to a unique discrete unitary count value, a first plurality of said discrete count gates being connected in said controlling relation to said count adding means, and a second plurality of said discrete count gates being connected in said controlling relation to said count defeat means.

17. A digital linearizer for linearizing non-linear variables, comprising an analog-to-frequency converter having an analog input and a variable frequency output as a function of the quantum value of the analog input thereto, a time interval controlled gate for selectively passing a cyclic signal which has cyclic variations as a function of the variable frequency output of said analog-to-frequency converter during a predetermined time interval, a readout count accumulator having a count adding input for adding counts thereto as a function of succeeding cycles of said cyclic signal during a said predetermined time interval, gate matrix means connected in controlled relation to an output of said readout count accumulator, and having discrete count value gates corresponding to individual ones of selected numerical count locations in said accumulator, a common count corrective unit in controlling relation with said count adding input to said readout count accumulator, and selective connecting means for selectively connecting said discrete count value gates in controlling relation to said common count corrective unit.

18. A digital linearizer according to claim 17, further comprising means for connecting a plurality of said accumulator count value gates in controlling relation to said common count corrective unit.

19. A digital linearizer according to claim 18, further comprising a second common count corrective unit in controlling relation with the connection to said readout, and means for connecting a different plurality of said accumulator count gates in controlling relation to said second common count corrective unit.

20. A digital linearizer according to claim 19, one of said common count corrective units being a positive add count unit, and the other of said common count corrective units being a defeat count unit operative to defeat the normal addition of a next succeeding time interval count in said accumulator as a function of the output of said converter.

21. A digital linearizer for non-linearly appearing variables desired to be digitally indicated or recorded in linearized form, comprising a digital counter base primary bit supplying means for supplying a quantum bit count varying in quantity proportional to the value of a non-linear variable to be recorded or indicated, connecting means connecting the output of said primary bit supplying means to said counter, count adding means having an output in individual bit count adding connection to said digital counter, selective individual-discrete-selective count-responsive add gate means connected to the count output of said counter and being connected in controlling relation to said count adding means, count defeat means operative to defeat the change of bit count state by said counter by a pulse from said primary bit supplying means, and selective individual-discrete-count-responsive subtract gate means connected to the count output of said counter and being connected in controlling relation to said count defeat means.

22. A digital linearizer according to claim 21, further comprising gate-control means for selectively modifying said individual-discrete-count-responsive add gate means and subtract gate means to enable linearizing accommodation of different non-linear variables desired to be linearized.

23. A digital linearizer according to claim 21, said count adding means comprising a gate in controlling relation to said counter, and an add bit generator having its output connected in controlling relation to said counter, said add bit generator being disabled except in the presence of an add command from said add gate means.

24. A digital linearizer according to claim 21, said count defeat means comprising a first bi-stable switch having an output in controlling relation with the input to said counter from said count adding means, and being responsive to a time sequence combination of a signal from said subtract gate means and the occurrence of a primary bit by said primary bit supplying means.

25. A digital linearizer for non-linearly appearing variables desired to be digitally indicated or recorded in linearized form, comprising base pulse generating means for generating a quantum pulse count cyclic signal in the form of a train of pulses varying in total quantity as a predetermined function of a non-linear variable to be indicated or recorded, a readout count accumulator having a count adding input for adding counts thereto as a function of succeeding cycles of said cyclic signal during a time interval, gate matrix means connected in controlled relation to an output of said readout count accumulator, and having discrete count value gates corresponding to individual ones of selected numerical count locations in said accumulator, and a common count corrective unit in controlling relation with said count adding input to said readout count accumulator, and selective connecting means for selectively connecting said discrete count value gates in controlling relation to said common count corrective unit.

* * * * *